United States Patent
Sonoda et al.

(10) Patent No.: US 8,924,081 B2
(45) Date of Patent: Dec. 30, 2014

(54) ELECTRIC POWER STEERING APPARATUS AND CONTROL DEVICE INTEGRATED-TYPE ELECTRIC MOTOR

(75) Inventors: Isao Sonoda, Chiyoda-ku (JP); Yoshihito Asao, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 423 days.

(21) Appl. No.: 12/992,537

(22) PCT Filed: Jul. 16, 2008

(86) PCT No.: PCT/JP2008/062815
§ 371 (c)(1),
(2), (4) Date: Nov. 12, 2010

(87) PCT Pub. No.: WO2010/007672
PCT Pub. Date: Jan. 21, 2010

(65) Prior Publication Data
US 2011/0066332 A1    Mar. 17, 2011

(51) Int. Cl.
*H02P 7/00* (2006.01)
*B62D 5/04* (2006.01)
*H02K 7/116* (2006.01)
*H02K 11/00* (2006.01)

(52) U.S. Cl.
CPC ............ *B62D 5/0406* (2013.01); *B62D 5/0463* (2013.01); *H02K 7/1166* (2013.01); *H02K 11/0073* (2013.01)
USPC .................. 701/42; 701/41; 701/43; 180/432

(58) Field of Classification Search
None
See application file for complete search history.

(56) References Cited

U.S. PATENT DOCUMENTS

| | | | |
|---|---|---|---|
| 4,765,426 A | 8/1988 | Shimizu | |
| 5,889,378 A | 3/1999 | Hayashi | |
| 6,194,849 B1 | 2/2001 | Wilson-Jones et al. | |
| 6,211,631 B1 | 4/2001 | Wilson-Jones et al. | |
| 6,577,030 B2 | 6/2003 | Tominaga et al. | |
| 7,141,948 B2 * | 11/2006 | Kifuku et al. | 318/432 |
| 7,157,877 B2 * | 1/2007 | Hirochi et al. | 318/400.01 |
| 7,161,317 B2 * | 1/2007 | Matsushita et al. | 318/432 |
| 7,621,367 B2 * | 11/2009 | Tominaga et al. | 180/444 |
| 2002/0060105 A1 | 5/2002 | Tominaga et al. | |

FOREIGN PATENT DOCUMENTS

| | | |
|---|---|---|
| DE | 10127169 A1 | 5/2002 |
| EP | 0831012 A2 | 3/1998 |
| FR | 2872770 A1 | 1/2006 |
| JP | 55-98154 U | 7/1980 |

(Continued)

OTHER PUBLICATIONS

Korean Office Action, Apr. 17, 2012.

(Continued)

*Primary Examiner* — Edward Torchinsky
(74) *Attorney, Agent, or Firm* — Sughrue Mion, PLLC; Richard C. Turner

(57) ABSTRACT

An electric power steering apparatus and control device integrated-type electric motor includes an electric motor driving circuit constituted by a plurality of semiconductor power elements and controlling electric power supplied to an armature winding of an electric motor, a switch device for opening and closing a connection between an input terminal of the electric motor driving circuit and an external power source, and another switch device for opening and closing the armature winding, wherein at least one of both the switch devices is constituted by a semiconductor switch element, and the power elements and the semiconductor switch element are mounted on a board attached to a metallic case.

6 Claims, 9 Drawing Sheets

(56) References Cited

FOREIGN PATENT DOCUMENTS

| | | |
|---|---|---|
| JP | 7-96387 B2 | 10/1995 |
| JP | 9-030434 A | 2/1997 |
| JP | 3560701 B2 | 2/1997 |
| JP | 11-155298 A | 6/1999 |
| JP | 2000-500102 A | 1/2000 |
| JP | 2001-315654 A | 11/2001 |
| JP | 2002-120739 A | 4/2002 |
| JP | 2002-345211 A | 11/2002 |
| JP | 3774624 B2 | 4/2003 |
| JP | 2004-129362 A | 4/2004 |
| JP | 2004-135492 A | 4/2004 |
| JP | 3560701 B2 | 6/2004 |
| JP | 2004-345643 A | 12/2004 |
| JP | 2006-21645 A | 1/2006 |
| JP | 2006-021645 A | 1/2006 |
| JP | 3774624 B2 | 2/2006 |
| JP | 3774624 U | 2/2006 |

OTHER PUBLICATIONS

Japanese Office Action dated Aug. 28, 2012 issued in Japanese Application No. 2010-520711.

Chinese Office Action, issued Nov. 5, 2012, Patent Application No. 200880129222.6.

* cited by examiner

ELECTRIC POWER STEERING APPARATUS AND CONTROL DEVICE INTEGRATED-TYPE ELECTRIC MOTOR

TECHNICAL FIELD

The present invention relates to an electric power steering apparatus loaded on a vehicle, and a control device integrated-type electric motor used for the electric power steering apparatus.

BACKGROUND ART

As well known, an electric power steering apparatus loaded on a vehicle is adapted to apply an assist torque via an electric motor to steering torque applied to a steering shaft by the driver of a vehicle, thereby reducing the operating force on the steering wheel from the driver. In a conventional electric power steering apparatus, a protective relay is provided between a motor driving circuit within a control device of the electric power steering apparatus, and an electric motor, and in a case where a semiconductor switch element used for the electric motor driving circuit has failed, particularly in a case where a semiconductor switch element has failed due to short-circuiting, the protective relay is operated to interrupt the electric motor from the electric motor driving circuit to prevent abnormal behavior of the electric motor (for example, refer to Patent Citation 1).
Patent Citation 1: JP-B-7-96387

DISCLOSURE OF THE INVENTION

Problem to be Solved by the Invention

In the conventional electric power steering apparatus as shown in Patent Citation 1, a mechanical relay is used as the aforementioned protective relay. Generally, since the mechanical relay requires a coil for opening and closing a contact point, a comparatively large volume is required within the control device. In addition, in a conventional electric power steering apparatus, since the mechanical relay is used, there are problems in that the number of opening and closing times is limited due to deterioration of the contact point, and failure is apt to occur.

Moreover, in such a conventional electric power steering apparatus, the heat dissipation performance of the protective relay and the control device is not particularly considered, and dissipation of internally generated of heat is structurally difficult. In order to suppress generation of heat so as to cope with a large current, it is necessary to enlarge the contact point of the protective relay or a conductive member for applying an electric current. As a result, there is a problem in that the control device is enlarged.

The invention has been accomplished in order to solve the above problems in the conventional electric power steering apparatus, and the object thereof is to provide an electric power steering apparatus and its control device integrated-type electric motor which prevent degradation of the characteristics of its parts, a decrease in lifespan, or the like and which are small-sized, highly efficient, inexpensive, and highly reliable.

Means for Solving the Problem

The electric power steering apparatus according to the invention is an electric power steering apparatus adapted to detect steering torque applied to a steering shaft by the driver of a vehicle via a steering wheel, and apply an assist torque corresponding to the detected steering torque to the steering shaft by an electric motor via a speed reduction mechanism. The electric power steering apparatus includes an electric motor driving circuit constituted by a plurality of semiconductor power elements and controlling electric power supplied to an armature winding of the electric motor, a switch device for opening and closing a connection between an input terminal of the electric motor driving circuit and an external power source, and another switch device for opening and closing the armature winding. At least one of both the switch devices is constituted by a semiconductor switch element, and the power elements and the semiconductor switch element are mounted on a board attached to a metallic case.

In addition, the electric power steering apparatus according to the invention is an electric power steering apparatus adapted to detect steering torque applied to a steering shaft by the driver of a vehicle via a steering wheel, and apply an assist torque corresponding to the detected steering torque to the steering shaft by an electric motor via a speed reduction mechanism. The electric power steering apparatus includes an electric motor driving circuit constituted by a plurality of semiconductor power elements and controlling electric power supplied to an armature winding of the electric motor, a switch device for opening and closing a connection between an input terminal of the electric motor driving circuit and an external power source, and another switch device for opening and closing the armature winding. At least one of both the switch devices is constituted by a semiconductor switch element, and the power elements and the semiconductor switch element are mounted on a board attached to a metallic case equipped on the outside of the electric motor.

In addition, the electric power steering apparatus according to the invention is an electric power steering apparatus adapted to detect steering torque applied to a steering shaft by the driver of a vehicle via a steering wheel, and apply an assist torque corresponding to the detected steering torque to the steering shaft by an electric motor via a speed reduction mechanism. The electric power steering apparatus includes an electric motor driving circuit constituted by a plurality of semiconductor power elements and controlling electric power supplied to an armature winding of the electric motor, a switch device for opening and closing a connection between an input terminal of the electric motor driving circuit and an external power source, and another switch device for opening and closing the armature winding. At least one of both the switch devices is constituted by a semiconductor switch element, and the power elements and the semiconductor switch element are mounted on a board attached to a metallic case configured separately from the electric motor.

The control device integrated-type electric motor of the invention is a control device integrated-type electric motor used for an electric power steering apparatus adapted to detect steering torque applied to a steering shaft by the driver of a vehicle via a steering wheel, and apply an assist torque corresponding to the detected steering torque to the steering shaft, and applying the assist torque to the steering shaft via a speed reduction mechanism. The electric motor includes an electric motor part including a stator, a rotator, and an armature winding; and a control device part integrally fixed to the electric motor part. The control device part includes a control device part internal space communicating with an internal space of the electric motor part, and houses, in the control device part internal space, an electric motor driving circuit constituted by a plurality of semiconductor power elements and controlling electric power supplied to the armature winding of the electric motor, a switch device for opening and closing a connection between an input terminal of the electric motor driving circuit and an external power source, and another switch device for opening and closing the armature winding. At least one of both the switch devices is constituted by a semiconductor switch element, and the power elements and the semiconductor switch element are mounted on a board attached to a metallic case of the electric motor part.

Moreover, the control device integrated-type electric motor of the invention is a control device integrated-type electric motor used for an electric power steering apparatus adapted to detect steering torque applied to a steering shaft by the driver of a vehicle via a steering wheel, and apply an assist torque corresponding to the detected steering torque to the steering shaft, and applying the assist torque to the steering shaft via a speed reduction mechanism. The electric motor includes an electric motor part including a stator, a rotator, and an armature winding; and a control device part integrally fixed to the outside of the electric motor part. The control device part has an electric motor driving circuit constituted by a plurality of semiconductor power elements and controlling electric power supplied to the armature winding of the electric motor, a switch device for opening and closing a connection between an input terminal of the electric motor driving circuit and an external power source, and another switch device for opening and closing the armature winding. At least one of both the switch devices is constituted by a semiconductor switch element, and the power elements and the semiconductor switch element are mounted on a board attached to a metallic case of the control device part.

Advantage of the Invention

According to the electric power steering apparatus of this invention, the electric power steering apparatus includes an electric motor driving circuit constituted by a plurality of semiconductor power elements and controlling electric power supplied to an armature winding of the electric motor, a switch device for opening and closing a connection between an input terminal of the electric motor driving circuit and an external power source, and another switch device for opening and closing the armature winding. At least one of both the switch devices is constituted by a semiconductor switch element, and the power elements and the semiconductor switch element are mounted on a board attached to a metallic case. Thus, it is possible to obtain an electric power steering apparatus which prevents the degradation of the characteristics of its parts, a decrease in lifespan, or the like and which is small-sized, highly efficient, inexpensive, and highly reliable.

According to the electric power steering apparatus of this invention, the electric power steering apparatus includes an electric motor driving circuit constituted by a plurality of semiconductor power elements and controlling electric power supplied to an armature winding of the electric motor, a switch device for opening and closing a connection between an input terminal of the electric motor driving circuit and an external power source, and another switch device for opening and closing the armature winding. At least one of both the switch devices is constituted by a semiconductor switch element, and the power elements and the semiconductor switch element are mounted on a board attached to a metallic case equipped on the outside of the electric motor. Thus, it is possible to obtain an electric power steering apparatus which prevents the degradation of the characteristics of its parts, a decrease in lifespan, or the like and which is small-sized, highly efficient, inexpensive, and highly reliable.

Moreover, according to the electric power steering apparatus according to the invention is an electric power steering apparatus adapted to detect steering torque applied to a steering shaft by the driver of a vehicle via a steering wheel, and apply an assist torque corresponding to the detected steering torque to the steering shaft by an electric motor via a speed reduction mechanism. The electric power steering apparatus includes an electric motor driving circuit constituted by a plurality of semiconductor power elements and controlling electric power supplied to an armature winding of the electric motor, a switch device for opening and closing a connection between an input terminal of the electric motor driving circuit and an external power source, and another switch device for opening and closing the armature winding. At least one of both the switch devices is constituted by a semiconductor switch element, and the power elements and the semiconductor switch element are mounted on a board attached to a metallic case configured separately from the electric motor. Thus, it is possible to obtain an electric power steering apparatus which prevents the degradation of the characteristics of its parts, a decrease in lifespan, or the like and which is small-sized, highly efficient, inexpensive, and highly reliable, and there is an advantage that there is no inflow of heat into the metallic case from the electric motor even if the temperature of the electric motor is higher than the temperature of the metallic case.

According to the control device integrated-type electric motor of this invention, the electric motor includes an electric motor part including a stator, a rotator, and an armature winding; and a control device part integrally fixed to the electric motor part. The control device part includes a control device part internal space communicating with an internal space of the electric motor part, and houses, in the control device part internal space, an electric motor driving circuit constituted by a plurality of semiconductor power elements and controlling electric power supplied to the armature winding of the electric motor, a switch device for opening and closing a connection between an input terminal of the electric motor driving circuit and an external power source, and another switch device for opening and closing the armature winding. At least one of both the switch devices is constituted by a semiconductor switch element, and the power elements and the semiconductor switch element are mounted on a board attached to a metallic case of the electric motor part. Thus, it is possible to obtain a control device integrated-type electric motor which prevents the degradation of the characteristics of its parts, a decrease in lifespan, or the like and which is small-sized, highly efficient, inexpensive, and highly reliable.

Moreover, according to the control device integrated-type electric motor of this invention, the electric motor includes an electric motor part including a stator, a rotator, and an armature winding; and a control device part integrally fixed to the outside of the electric motor part. The control device part has an electric motor driving circuit constituted by a plurality of semiconductor power elements and controlling electric power supplied to the armature winding of the electric motor, a switch device for opening and closing a connection between an input terminal of the electric motor driving circuit and an external power source, and another switch device for opening and closing the armature winding. At least one of both the switch devices is constituted by a semiconductor switch element, and the power elements and the semiconductor switch element are mounted on a board attached to a metallic case of the control device part. Thus, it is possible to obtain a control device integrated-type electric motor which prevents the degradation of the characteristics of its parts, a decrease in lifespan, or the like and which is small-sized, highly efficient, inexpensive, and highly reliable, and a design becomes possible which is more specialized in individual functions without mixture of the parts of the electric motor part and parts of the control device part.

BEST MODE FOR CARRYING OUT THE INVENTION

Embodiment 1

Figure 1:
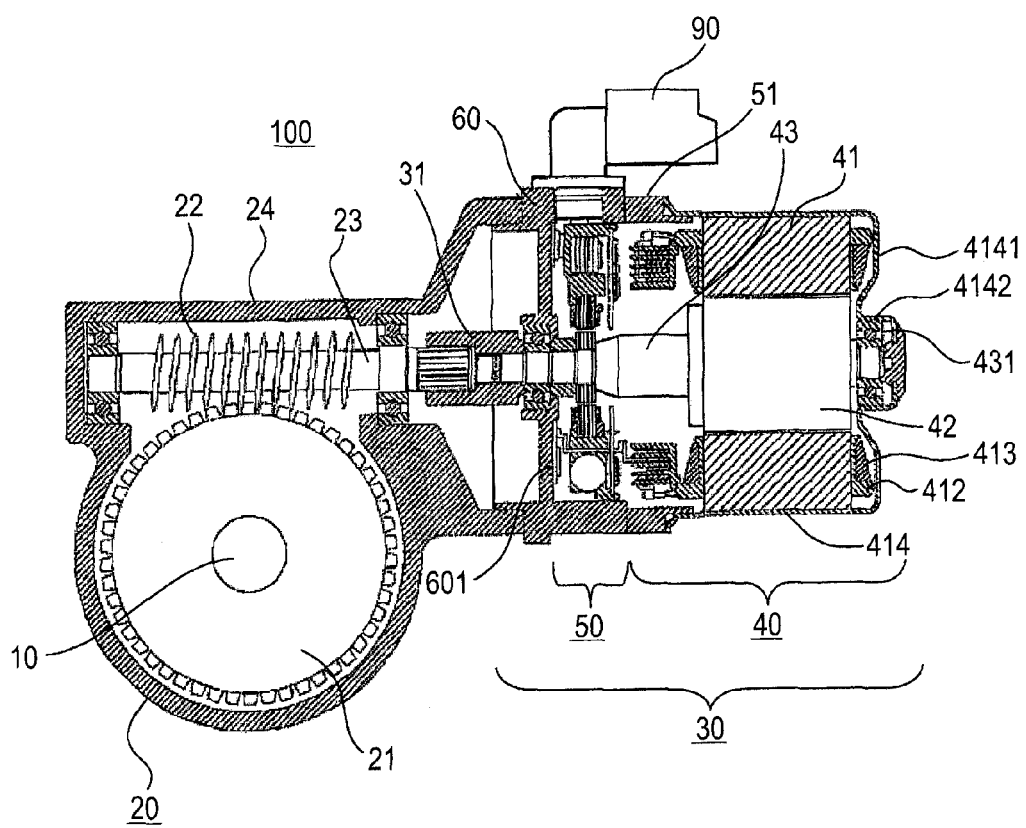
FIG. 1 is a sectional view showing an electric power steering apparatus according to Embodiment 1 of this invention.
Figure 2:
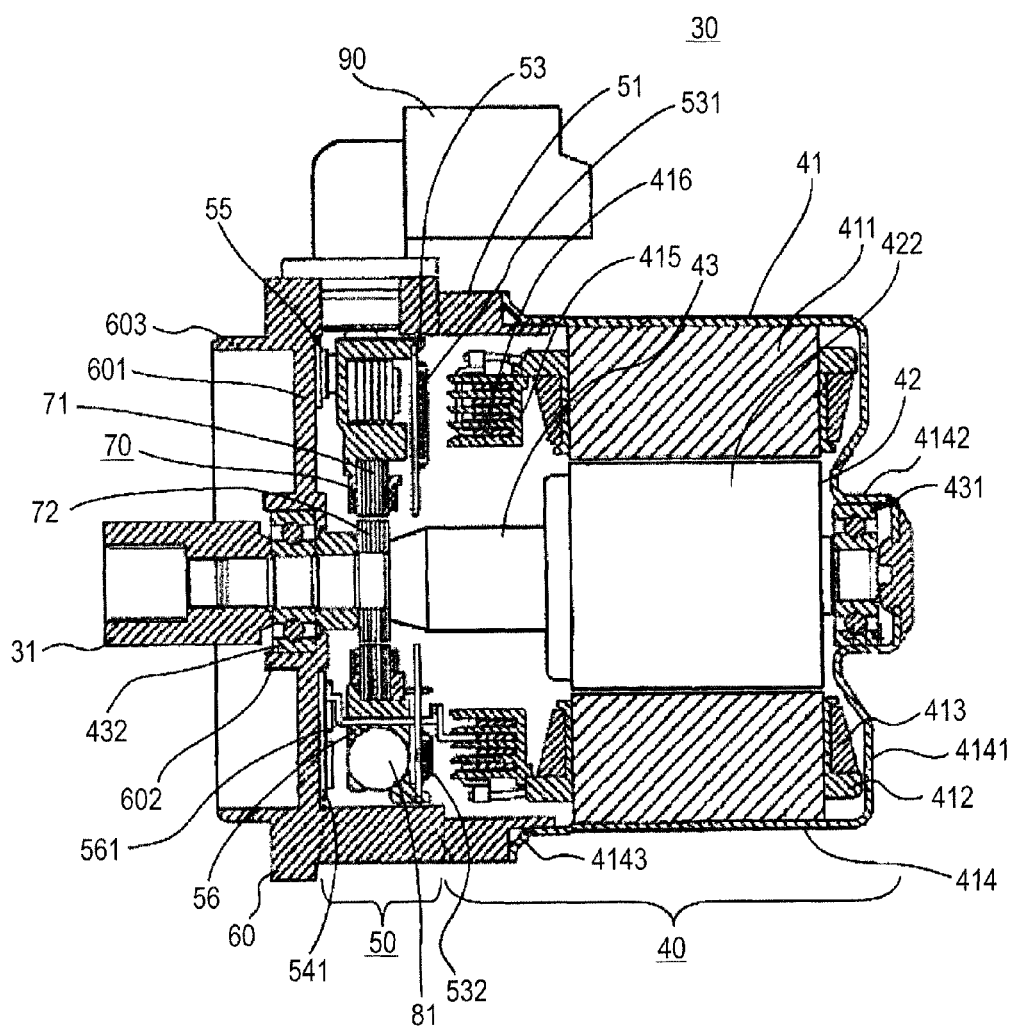
FIG. 2 is a sectional view showing a control device integrated-type electric motor in the electric power steering apparatus according to Embodiment 1 of this invention.

Hereinafter, an electric power steering apparatus and a control device integrated-type electric motor according to Embodiment 1 of this invention will be described in detail. FIG. 1 is a sectional view showing an electric power steering apparatus according to Embodiment 1 of this invention, and FIG. 2 is a sectional view showing a control device integrated-type electric motor in the electric power steering apparatus. In this embodiment 1, the control device integrated-type electric motor is constituted as a permanent magnet-type synchronous electric motor.

In FIGS. 1 and 2, in the electric power steering apparatus 100, a control device integrated-type electric motor 30 is connected to a steering shaft 10 connected to a steering wheel (not shown) which is operated by a driver, via a speed reduction mechanism 20. The control device integrated-type electric motor 30 applies an assist torque to the steering shaft via the speed reduction mechanism 20 at the time of the operation of the steering wheel by a driver, and reduces a driver's steering wheel operating force.

The speed reduction mechanism 20 includes a worm wheel 21 fixed to the steering shaft 10, a worm gear 22 having a worm gear shaft 23 which meshes with the worm wheel 21, and a housing 24. The worm gear shaft 23 is spline-connected to a rotor shaft 43 of the electric motor 30 by a boss 31 serving as coupling fixed to an end of the rotor shaft 43 of the electric motor 30.

The control device integrated-type electric motor 30 includes an electric motor part 40 having a stator 41, a rotor 42, and a three-phase stator winding (hereinafter simply referred to as a stator winding) 413 serving as an armature winding, a control device part 50 including an electric motor driving circuit, and a speed-reduction-mechanism-side case 60 serving as a metallic case. The stator 41 includes a hollow tubular stator core 411 formed by stacking a plurality of magnetic steel sheets, and a stator winding 413 wound around the stator core 411 via an insulator 412 made of resin. The stator core 411 is press-fitted and fixed to an inner peripheral surface of a cylindrical frame 414 made of iron.

The frame 414 has a bottom part 4141 at one axial end thereof, and a central portion of the bottom part 4141 is formed with a rear bearing box 4142. A rear bearing 431 formed from a ball bearing is press-fitted and fixed to an inner peripheral surface of the rear bearing box 4142 of the frame 414.

The other axial end of the frame 414 is opened, and a spigot portion 4143 for coupling with an electric-motor-side case 51 is formed at a peripheral edge of the opened other end. The spigot portion 4143 of the frame 414 is fitted into a stepped portion formed at an outer peripheral surface of one axial end of the electric-motor-side case 51, and the frame 414 is fixed to the electric-motor-side case 51 with screws (not shown). The aforementioned electric-motor-side case 51 is formed from a die-cast molding of aluminum alloy, and the other axial end thereof is coupled with the axial end of the speed-reduction-mechanism-side case 60.

The stator winding 413 is constituted by windings for respective phases including U phase, V phase, and W phase. In this embodiment 1, the stator winding is Y-connected by a winding terminal 416 housed in a terminal holder 415 made of resin. In addition, the stator winding 413 may be Δ-connection.

The rotor 42 includes the aforementioned rotor shaft 43, and a rotator magnetic pole 422 having permanent magnets fixed to an outer peripheral portion of the rotor shaft 43. The rotor shaft 43 has one end rotatably supported by the aforementioned rear bearing 431, and the other end rotatably supported by a front bearing 432. The rotator magnetic pole 422 rotates in synchronization with the rotation of a rotating magnetic field generated as three-phase alternating currents are supplied to the stator winding 413.

The speed-reduction-mechanism-side case 60 is formed from a die-cast molding of aluminum alloy, and includes an inner wall portion 601 which extends in a direction orthogonal to the axial direction thereof. A central portion of the inner wall portion 601 is formed with a front bearing box 602. The front bearing 432 formed from a ball bearing is press-fitted and fixed to an inner peripheral surface of the front bearing box 602. A spigot portion 603 formed at one axial end of the speed-reduction-mechanism-side case 60 is fitted to an inner peripheral surface of the housing 24 of the speed reduction mechanism 20, and the speed-reduction-mechanism-side case 60 and the housing 24 of the speed reduction mechanism 20 are integrally fixed with bolts (not shown).

A rotation sensor 70 constituted by a resolver is provided at a central portion of an internal space of the speed-reduction-mechanism-side case 60. The rotation sensor 70 includes a stator 71 to which an inner peripheral portion of a terminal part 56 (which will be described later) fixed to the inside of the speed-reduction-mechanism-side case 60 is fixed, and a rotor 72 fixed to an outer peripheral surface of the rotor shaft 43. A detection winding provided in the stator 71 of the rotation sensor 70 generates a rotation detection signal corresponding to the rotating speed of the rotor 72, and accordingly, the rotating speed of the rotor 42 of the electric motor part 40.

The control device part 50 includes a control device part internal space communicating with the internal space of the electric motor part 40, and houses, in the control device part internal space, a control board 53 made of glass epoxy resin on which a microcomputer 531 and a FET driving circuit 532 are mounted, three power boards 541, 542, and 543 mounted (only 541 is shown in FIG. 2) each having a ceramic base on which two power elements constituted by power MOSFETs, one semiconductor switch element, and one shunt resistor are mounted, a switch board 55 having a ceramic base on which two semiconductor switch elements are loaded. Mounting of semiconductor switch elements in the three power boards 541, 542, and 543 and the one switch board 55 will be described later in detail.

Figure 3:
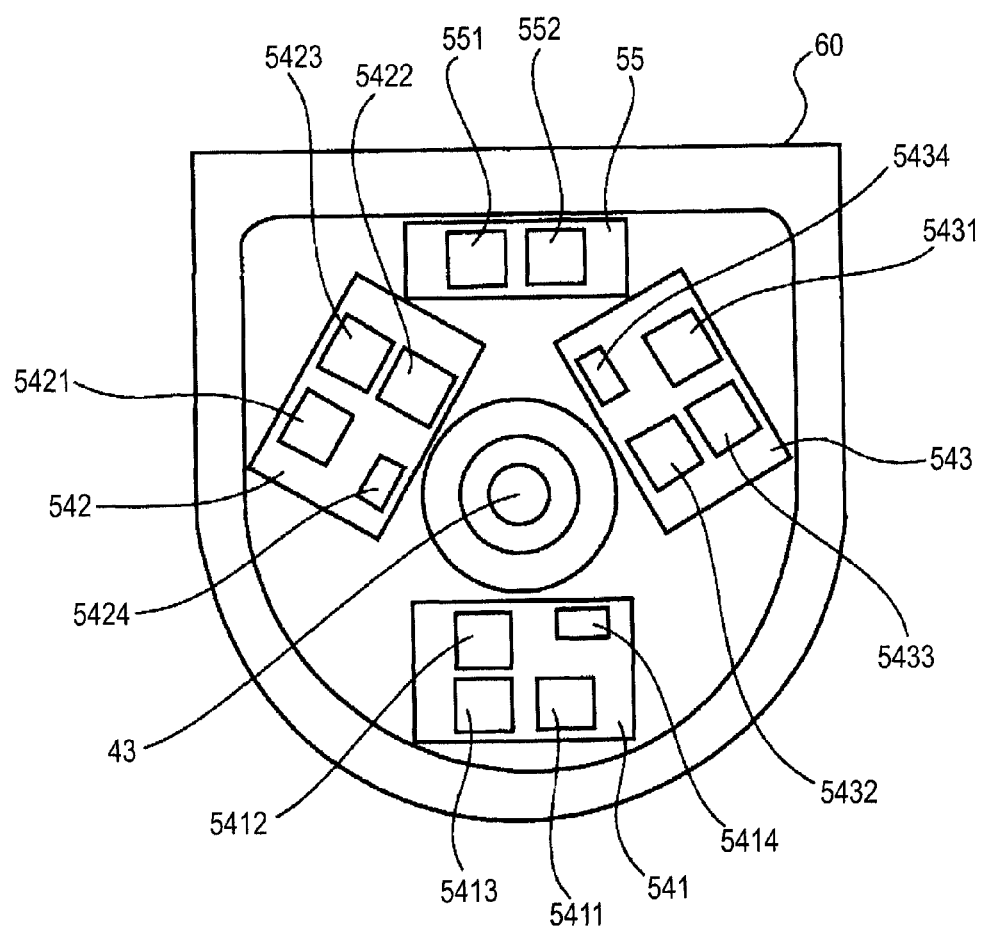
FIG. 3 is a plan view when the inside of a speed-reduction-mechanism-side case of the electric power steering apparatus according to Embodiment 1 of this invention is seen from electric-motor side shown in a state where a power board and a switch board are attached.

FIG. 3 is a side view showing the side surface of the speed-reduction-mechanism-side case 60 on the side of the electric motor in a state where the power boards 541, 542, and 543 and the switch board 55 are attached. The aforementioned three power boards 541, 542, and 543 are respectively provided corresponding to the respective U-phase, V-phase, and W-phase windings of the stator winding 423, and the power boards 541, 542, and 543, as shown in FIG. 3, are almost uniformly arranged radially around the rotor shaft 43. The switch board 55 is located between the power boards 542 and 543, and is arranged in an upper portion of the drawing. The power boards 541, 542, and 543 and the switchboards 55 are brought into close contact with and fixed to an electric-motor-side wall surface of the inner wall portion 601 of the speed-reduction-mechanism-side case 60.

As shown in FIG. 3, the power board 541 is mounted with the power element 5411 which constitutes a U-phase positive-electrode-side arm of a three-phase bridge circuit which constitutes the electric motor driving circuit, a power element 5412 which constitutes a U-phase negative-electrode-side arm, one semiconductor switch element 5413 inserted between the U-phase winding of the stator winding 413 and an U-phase output terminal of the aforementioned three-phase bridge circuit, and one shunt resistor 5414 inserted between the power element 5412 and a grounding potential portion of a vehicle.

Similarly, the power board 542 is mounted with a power element 5421 which constitutes a W-phase positive-electrode-side arm of the aforementioned three-phase bridge circuit, a power element 5422 which constitutes a W-phase negative-electrode-side arm, one semiconductor switch element 5423 inserted between the W-phase winding of the stator winding 413 and a W-phase output terminal of the three-phase bridge circuit, and one shunt resistor 5424 inserted between the power element 5422 and the grounding potential portion of the vehicle.

Similarly, the power board 543 is mounted with a power element 5431 which constitutes a V-phase positive-electrode-side arm of the aforementioned three-phase bridge circuit, a power element 5432 which constitutes a V-phase negative-electrode-side arm, one semiconductor switch element 5433 inserted between the V-phase winding of the stator winding 413 and a V-phase output terminal of the three-phase bridge circuit, and one shunt resistor 5434 inserted between the power element 5432 and the grounding potential portion of the vehicle.

The switch board 55 is mounted with two semiconductor switch elements 551 and 552 inserted between a positive-electrode-side direct current terminal of the aforementioned three-phase bridge circuit and a battery serving as a direct current power source which will be described later.

Next, in FIG. 2, a terminal part 56, which is integrally formed by insert-molding a plurality of copper terminals 561 from resin, is provided in the internal space of the speed-reduction-mechanism-side case 60. The aforementioned control board 53 is fixed to a side portion of the terminal part 56 on the side of the electric motor. As the control board 53 is fixed to the side portion of the terminal part 56 on the side of the electric motor, the control board 53 is maintained at a certain distance from the power boards 541, 542, and 543 and the switch board 55.

The terminal 561 is electrically connected to the FET driving circuit 532 mounted on the control board 53, the aforementioned power elements 5411, 5412, 5421, 5422, 5431, and 5432 provided on the power boards 541, 542, and 543, respectively, the semiconductor switch elements 5413 and 5423, and 5433, or the like.

In addition, three capacitors 81, 82, and 83 (only 81 is shown in FIG. 2) for absorbing the ripple of an electric current which flows into the stator winding 413 of the electric motor part 40, and a coil 84 (not shown in FIG. 2) for absorbing a noise are attached to the terminal part 506. A power connector 90 fixed to the speed-reduction-mechanism-side case 60 is led out of the positive-electrode-side direct current terminal of the three phase bridge circuit via the semiconductor switch elements 551 and 552 mounted on the aforementioned switch board 55, and is connected to the battery serving as the direct current power source.

Figure 4:
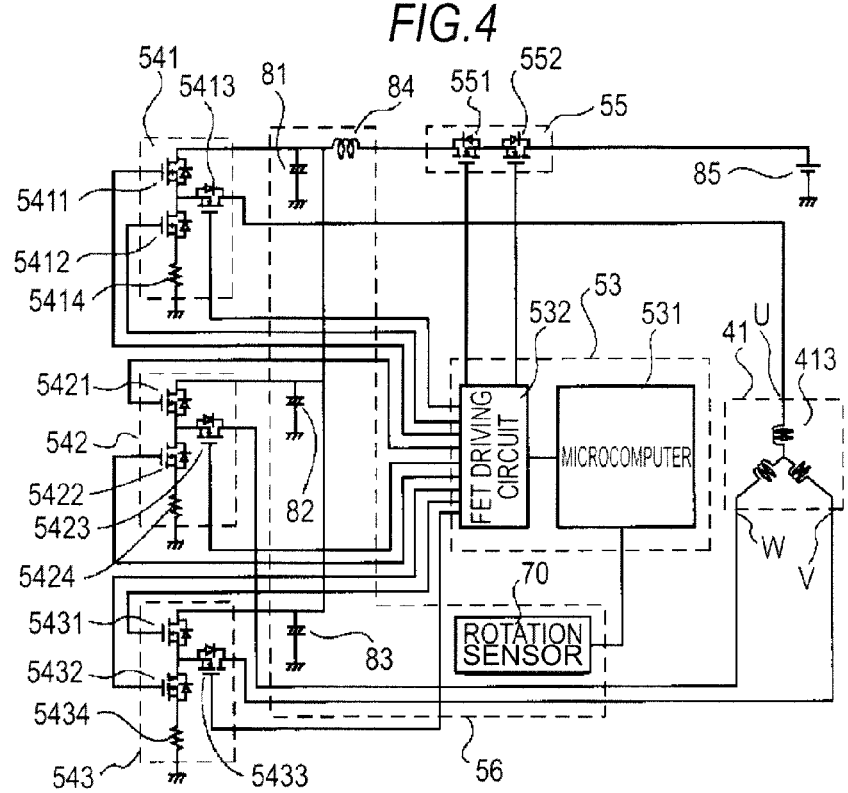
FIG. 4 is a circuit diagram showing a circuit configuration of a control device part of the control device integrated-type electric motor in the electric power steering apparatus according to Embodiment 1 of this invention.

Next, a circuit configuration of the control device part 50 configured as mentioned above will be described. FIG. 4 is a circuit diagram showing the circuit configuration of the control device part 50. In FIG. 4, the stator winding 413 is Y-connected by the winding terminal 416 as mentioned above. In the pair of power elements 5411 and 5412 which is mounted on the power board 541 and each has one end connected to each other, one power element 5411 constitutes the U-phase positive-electrode-side arm of the three-phase bridge circuit, and the other power element 5412 constitutes the U-phase negative-electrode-side arm. In addition, the other end of the power element 5411 is connected to the capacitor 81 for ripple absorption, and the coil 84 for noise absorption, and the other end of the power element 5412 is connected to the grounding potential portion of the vehicle via the shunt resistor 5414. A connection point where one end of the aforementioned power elements 5411 and 5412 are connected to each other serves as a U-phase alternating-current-side terminal of the three-phase bridge circuit. In addition, the semiconductor switch element 5413 mounted on the power board 541 has one end connected to the aforementioned U-phase alternating-current-side terminal and the other end connected to a U-phase terminal of the stator winding 413.

In the pair of power elements 5421 and 5422 which is mounted on the power board 542 and has one end connected to each other, one power element 5421 constitutes the W-phase positive-electrode-side arm of the three-phase bridge circuit, and the other power element 5422 constitutes the W-phase negative-electrode-side arm. In addition, the other end of the power element 5421 is connected to the capacitor 82 for ripple absorption, and the coil 84 for noise absorption, and the other end of the power element 5422 is connected to the grounding potential portion of the vehicle via the shunt resistor 5424. A connection point where one end of the aforementioned power elements 5421 and 5422 are connected to each other serves as a W-phase alternating-current-side terminal of the three-phase bridge circuit. In addition, the semiconductor switch element 5423 mounted on the power board 542 has one end connected to the aforementioned W-phase alternating-current-side terminal and the other end connected to a W-phase terminal of the stator winding 413.

In the pair of power elements 5431 and 5432 which is mounted on the power board 543 and has one end connected to each other, one power element 5431 constitutes the V-phase positive-electrode-side arm of the three-phase bridge circuit, and the other power element 5432 constitutes the V-phase negative-electrode-side arm. In addition, the other end of the power element 5431 is connected to the capacitor 83 for ripple absorption, and the coil 84 for noise absorption, and the other end of the power element 5432 is connected to the grounding potential portion of the vehicle via the shunt resistor 5434. A connection point where one end of the aforementioned power elements 5431 and 5432 are connected to each other serves as a V-phase alternating-current-side terminal of the three-phase bridge circuit. In addition, the semiconductor switch element 5433 mounted on the power board 543 has one end connected to the aforementioned V-phase alternating-current-side terminal and the other end connected to a V-phase terminal of the stator winding 413.

The pair of semiconductor switch elements 551 and 552 mounted on the switch board 55 has one end connected to each other, the other end of one semiconductor switch 551 is connected to the positive-electrode-side direct current terminal of the three-phase bridge circuit via the coil 84, the other end of the other semiconductor switch 552 is connected to the battery 85 loaded on the vehicle via the aforementioned power connector 90 (refer to FIGS. 1 and 2).

The FET driving circuit 532 mounted on the control board 53 has an output terminal connected to the respective gates of the aforementioned respective power elements 5411 and 5412, 5421 and 5422 and 5431 and 5432, the semiconductor switch elements 5413, 5423, and 5433, and the semiconductor switch elements 551 and 552, and is configured so as to give a gate driving signal to these gates with a predetermined timing, respectively. The microcomputer 531 mounted on the control board 53 controls output timing of the gate driving signal output by the FET driving circuit 532 on the basis of the rotation detection signal from the aforementioned rotation sensor 70.

In the electric power steering apparatus 100 according to Embodiment 1 of this invention configured as described above, when a driver operates the steering wheel to apply steering torque to the steering shaft 10, a torque detecting device (not shown) detects steering torque, and inputs the steering torque to the microcomputer 531. In addition, the rotation detection signal corresponding to the number of steering revolutions detected by the rotation sensor 70 is input to the microcomputer 531. The microcomputer 531 calculates the assist torque on the basis of the input steering torque, the number of steering revolutions, the speed signal of the vehicle, or the like, and controls the three-phase bridge circuit which is the electric motor driving circuit so that the electric motor part 40 generates the torque for adding the assist torque to the steering shaft 10 via the speed reduction mechanism 20.

That is, the FET driving circuit 532 generates a gate driving signal with a predetermined timing on the basis of a command from the microcomputer 531, and controls conduction of the respective power elements 5411, 5412, 5421, 5422, 5431, and 5432 of the three-phase bridge circuit. Thereby, the three-phase bridge circuit generates a predetermined three-phase alternating current electric power, supplies three-phase alternating currents to the stator winding 413 of the electric motor part 40, and drives the electric motor part 40. The torque generated by the electric motor part 40 is applied to the steering shaft 10 as the assist torque via the speed reduction mechanism 20. Thereby, the operating force of the steering wheel by a driver is reduced.

Here, supposing that abnormalities, such as an ON failure, have occurred in any one or a plurality of power elements among the power elements 5411, 5412, 5421, 5422, 5431, and 5432 which constitute the three-phase bridge circuit which is the electric motor driving circuit, normal three-phase alternating currents are no longer supplied to the stator winding 413. As a result, the operation of the electric motor part 40 may become abnormal, and a danger may be brought about in the running of the vehicle.

Thus, when abnormalities have occurred in the power elements as mentioned above, the FET driving circuit 532 stops the gate driving signal to the semiconductor switch elements 551 and 552 inserted between the positive-electrode-side direct current terminal of the three-phase bridge circuit, and the battery 85 on the basis of a command from the microcomputer 531, and stops the gate driving signal to the semiconductor switch elements 5413, 5423, and 5433 connected between an alternating current output terminal of the three-phase bridge circuit and each phase winding of the stator winding 413.

Thereby, the three-phase bridge circuit serving as the electric motor driving circuit provided in the control device part 50 is separated from the battery 85 and its operation is stopped, and the stator winding 413 is separated from the three-phase bridge circuit. As the stator winding 413 is separated from the three-phase bridge circuit, the stator winding 413 is prevented from being short-circuited due to a power element which has failed. Accordingly, it is possible to prevent, for example, abnormal situations where a braking force in the direction opposite to the steering direction is generated in the electric motor part 40, and operation of the steering wheel becomes difficult.

In addition, in the case of failures other than the failure of the power elements, similarly to the above, the gate driving signal to the semiconductor switch elements 551 and 552 and the semiconductor switch elements 5413, 5423, and 5433 may be stopped. Moreover the gate driving signal only to any semiconductor switch of the semiconductor switch elements 551 and 552 and the semiconductor switch elements 5413, 5423, and 5433 may be stopped depending on the state of failure of the power elements, or the state of failure of elements other than the power elements.

In addition, in the above description, both the switches connected between the positive-electrode-side direct-current terminal of the three-phase bridge circuit, and the battery 85, and the switches connected between the alternating current output terminal of the three-phase bridge circuit and the stator winding 413 are constituted by semiconductor switch elements. However, only one of these switches may be constituted by semiconductor switch elements, and the other may be constructed by a mechanical relay or the like.

As described above, according to the electric power steering apparatus according to Embodiment 1 of this invention, at least one of the semiconductor switch elements 551 and 552 connected between the positive-electrode-side direct-current terminal of the three-phase bridge circuit, and the battery 85, and the semiconductor switch elements 5413, 5423, and 5433 connected between the alternating current output terminal of the three-phase bridge circuit and the stator winding 413 is constituted by the semiconductor switch elements. Thus, size reduction and current increase of the electric power steering apparatus can be achieved, and reliability can be improved.

As mentioned above, in the conventional apparatus, the mechanical protective relay is used between the electric motor driving circuit and the electric motor, and the coil for opening and closing the contact point of the relay is required. In addition, in order to apply a large current, it is necessary to enlarge the contact point of the relay or a member which applies an electric current. Moreover, since the mechanical relay is used, the number of times the relay may be opened and closed is limited due to deterioration of the contact point, and there is a problem in that failure is apt to occur. However, according to the electric power steering apparatus according to Embodiment 1 of this invention, since the semiconductor switch elements are used, parts, such as a coil, become unnecessary unlike the mechanical relay, and a size reduction is easy. In addition, according to the electric power steering apparatus according to Embodiment 1 of this invention, the semiconductor switch elements can also be enlarged by using semiconductor switch elements to the extent of the size reduction allowable when compared with the conventional case when a mechanical relay is used. Thus, it is possible to achieve a larger current. Moreover, since there are no mechanical contacts in the semiconductor switch elements, there are no mechanical failures, and reliability is superior.

In addition, according to the electric power steering apparatus according to Embodiment 1 of this invention, the switch board on which the semiconductor switch elements are mounted and the power board on which the power elements are mounted are loaded on the inner wall portion of the speed-reduction-mechanism-side case formed from metal. Thus, heat can be conducted to the speed-reduction-mechanism-side case through each board, and the heat generated in the semiconductor switch elements can be effectively radiated. Accordingly, a size reduction and current increase of the semiconductor switch elements are possible, and the electric power steering apparatus can be miniaturized.

Moreover, according to the electric power steering apparatus according to Embodiment 1 of this invention, the three power boards are almost uniformly arranged radially around the rotor shaft of an electric motor part. Thus, heat generated by the power elements mounted on the power boards is uniformly transmitted to the speed-reduction-mechanism-side case from the three power boards. Accordingly, the temperature distribution of the speed-reduction-mechanism-side case also becomes uniform, and the maximum temperature of the power elements can be reduced.

In addition, in a case where the power boards and the aforementioned mechanical relay are used as in the conventional apparatus, in order to connect the power boards with the mechanical relay, a relay member is required. However, according to the electric power steering apparatus according to Embodiment 1 of this invention, the semiconductor switch elements are mounted on a board common to the power boards. Thus, wiring lines to the semiconductor switch elements from the power boards can be connected together by aboard pattern, members which connect the semiconductor switch elements with the power boards can be reduced, and a low cost and size reduction of the apparatus can be achieved.

Moreover, according to the electric power steering apparatus according to Embodiment 1 of this invention, the semiconductor switch elements which interrupt conduction within the electric motor are loaded between each phase winding of the stator winding of the electric motor part, and the alternating-current terminal of the three-phase bridge circuit constituted by the power elements. Thus, in a case where a power element has failed due to short-circuiting, abnormal behavior of the electric motor can be prevented by bringing this semiconductor switch into an open state.

In addition, according to the electric power steering apparatus according to Embodiment 1 of this invention, the power board on which the semiconductor switch elements and the power elements are mounted is split into three for every phase and is loaded on the case, the board for each phase can be freely arranged, the space can be effectively utilized, and the apparatus can be miniaturized. Moreover, since three power boards are arranged radially around the rotor shaft of the electric motor part, a projection area seen from the direction of the rotor shaft can be made smaller.

In addition, according to the electric power steering apparatus according to Embodiment 1 of this invention, the control device which is conventionally loaded on a dedicated case is loaded in the electric motor case to form the control device integrated-type electric motor. Thus, a case for the control device becomes unnecessary, and size reduction, weight reduction, and cost reduction of the apparatus can be achieved.

Embodiment 2

In the aforementioned Embodiment 1, the power board on which the power elements and the semiconductor switch elements are mounted are split into three for every phase of U-phase, V-phase, and W-phase of the electric motor part, these power boards are arranged radially around the rotor shaft of the electric motor part, and the switch board which is mounted with the semiconductor switch elements for interrupting the conduction between the control device of the electric motor part and the external battery is arranged at a position apart from the power boards. However, in Embodiment 2, power elements for all the phases including U-phase, V-phase, and W-phase, semiconductor switch elements which interrupt the conduction within the electric motor, and a semiconductor switch element for interrupting the conduction with the outside of the electric motor are all mounted on one power board.

Figure 5:
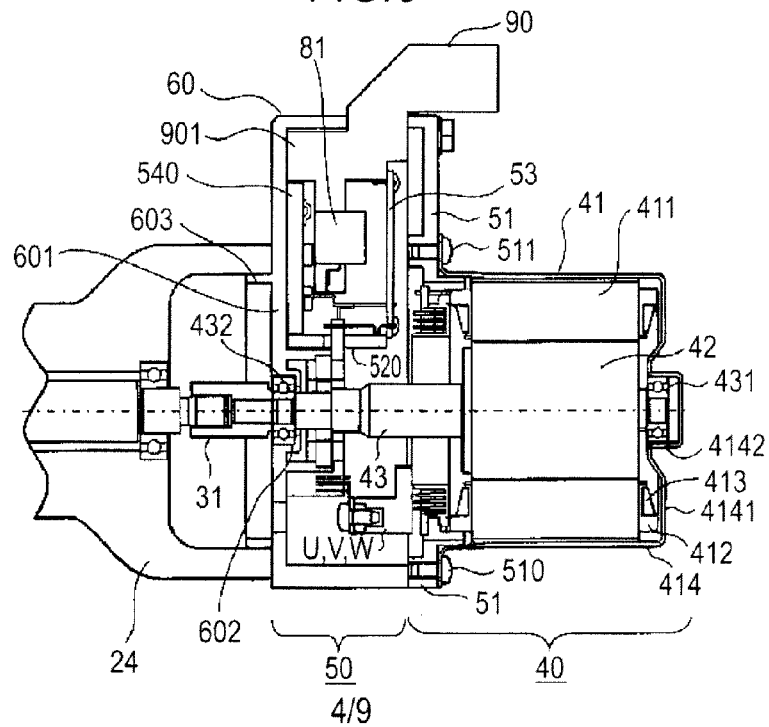
FIG. 5 is a sectional view showing a control device integrated-type electric motor in the electric power steering apparatus according to Embodiment 2 of this invention.
Figure 6:
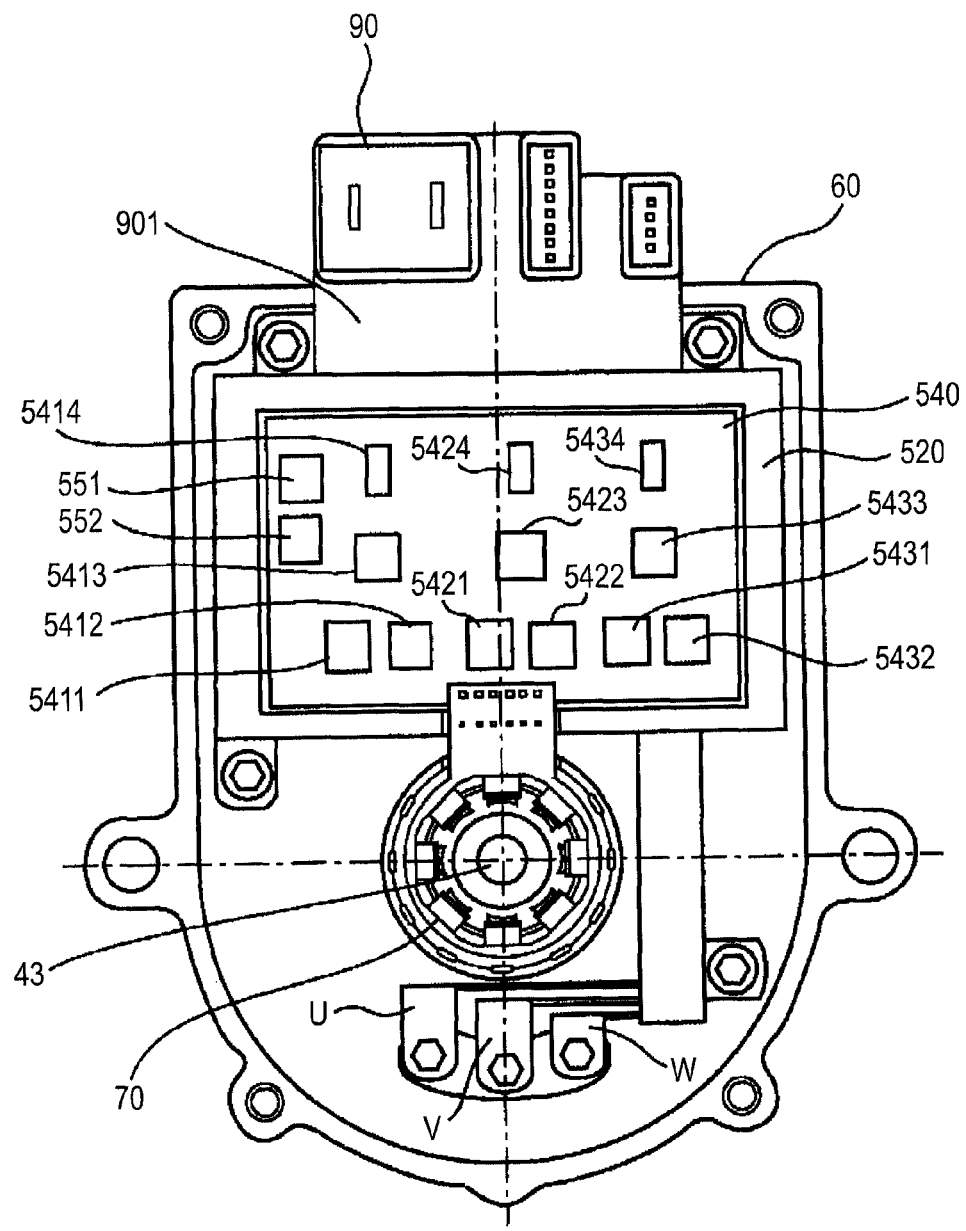
FIG. 6 is a plan view when the inside of a speed-reduction-mechanism-side case of the electric power steering apparatus according to Embodiment 2 of this invention is seen from electric-motor side shown in a state where a power board is attached.

Hereinafter, an electric power steering apparatus and a control device integrated-type electric motor according to Embodiment 2 of this invention will be described. FIG. 5 is a sectional view of portions of the control device integrated-type electric motor and speed reduction mechanism of the electric power steering apparatus according to Embodiment 2 of this invention, and FIG. 6 is a plan view when the control device in that control device integrated-type electric motor is seen from the electric-motor side. In this Embodiment 2, the control device integrated-type electric motor is constituted as a permanent magnet-type synchronous electric motor.

In FIGS. 5 and 6, the speed-reduction-mechanism-side case 60 fixed to the housing 24 of the speed reduction mechanism is formed from a die-cast molding of aluminum alloy. An upper portion in the drawing, of the speed-reduction-mechanism-side case 60 further protrudes up from a top face portion in the drawing, of the housing 24 of the speed reduction mechanism. The wall portion 601 of the speed-reduction-mechanism-side case 60 is formed with the front bearing box 602. The front bearing 432 formed from a ball bearing is press-fitted and fixed to an inner peripheral surface of the front bearing box 602. A spigot portion 603 formed at one axial end of the speed-reduction-mechanism-side case 60 is fitted to an inner peripheral surface of the housing 24 of the speed reduction mechanism 20, and the speed-reduction-mechanism-side case 60 and the housing 24 of the speed reduction mechanism 20 are integrally fixed with bolts (not shown).

The rotation sensor 70 constituted by a resolver includes the stator fixed to the speed-reduction-mechanism-side case 60, and the rotor fixed to the outer peripheral surface of the rotor shaft 31. A control device case 520 having only side surface portions is fixed inside the speed-reduction-mechanism-side case 60 with three screws. A power board 540 of the control device part 50 is arranged in the control device case 520, and is brought into close contact with and fixed to the wall portion 601 of the speed-reduction-mechanism-side case 60.

The power board 540 includes a ceramic base, and as shown in FIG. 6, is mounted with the power element 5411 which constitutes the U-phase positive-electrode-side arm of the three-phase bridge circuit which constitutes the electric motor driving circuit, and the power element 5412 which constitutes the U-phase negative-electrode-side arm; the power element 5421 which constitutes the W-phase positive-electrode-side arm, and the power element 5422 which constitutes the W-phase negative-electrode-side arm; and the power element 5431 which constitutes the V-phase negative-electrode-side arm and the power element 5432 which constitutes the V-phase negative-electrode-side arm.

In addition, the power board 540 is mounted with the semiconductor switch element 5413 inserted between the U-phase winding of the stator winding, and the U-phase output terminal of the three-phase bridge circuit, the semiconductor switch element 5423 inserted between the W-phase winding of the stator winding, and the W-phase output terminal of the three-phase bridge circuit, the semiconductor switch element 5433 inserted between the V-phase winding of the stator winding and the V-phase output terminal of the three-phase bridge circuit, and the semiconductor switch elements 551 and 552 inserted between the positive-electrode-side direct current terminal of the three-phase bridge circuit serving as the electric motor driving circuit and the external battery.

Moreover, the power board 540 is mounted with the ground resistor 5414 inserted between the power element 5412 and the grounding potential portion of the vehicle, the ground resistor 5424 inserted between the power element 5422 and the grounding potential portion of the vehicle, and the shunt resistor 5434 inserted between the power element 5432 and the grounding potential portion of the vehicle.

In addition, the three capacitors 81, 82, and 83 described in FIG. 4 (only capacitor 81 is shown in FIG. 5) for absorbing the ripple of an electric current which flows into the stator winding 413 of the electric motor part 40, and the coil 84 (not shown in FIG. 5) for absorbing a noise are arranged inside the control device case 520. The power connector 90 fixed to the inside of the speed-reduction-mechanism-side case 60 by a fixing portion 901 is connected to the three-phase bridge circuit serving as the aforementioned electric motor driving circuit inside the control device case 520, and is led out to the outside of the speed-reduction-mechanism-side case 60. In addition, respective U-phase, V-phase, and W-phase terminals led out of the stator winding 413 are fixed to the inside of the speed reduction mechanism side 60, and these terminals are connected to the semiconductor switch elements 5413, 5423, and 5433 inside the control device case 520.

The control board 53 made of glass epoxy resin on which the microcomputer 531 (not shown) and the FET driving circuit 532 (not shown) are mounted is fixed to an electric-motor-side end of the control device case 520. This secures a certain distance between the control board 53 and the power board 540.

The spigot portion of the frame 414 is fitted into the stepped portion formed at the outer peripheral surface of one axial end of the electric-motor-side case 51, and the frame 414 is fixed to the electric-motor-side case 51 with screws. The aforementioned electric-motor-side case 51 is formed from a die-cast molding of aluminum alloy, and the other axial end thereof is coupled with the axial end of the speed-reduction-mechanism-side case 60 with bolts. The other configurations are the same as those of Embodiment 1.

In the electric power steering apparatus according to Embodiment 2 of this invention configured as described above, the power elements for all the phases including U-phase, V-phase, and W-phase, the semiconductor switch elements which interrupt the conduction within the electric motor, and the semiconductor switch elements for interrupting the conduction with the outside of the electric motor are all mounted on one power board 540. Thus, compared to the electric power steering apparatus according to Embodiment 1, only one power board has to be loaded on the electric power steering apparatus. In addition, wiring lines between the respective power elements can also be performed on one power board. Thus, the machinability of the electric power steering apparatus improves, and there is an effect in cost reduction.

Moreover, in the electric power steering apparatus according to Embodiment 2 of this invention, the number of the power boards 540 is one, and the power connector 90 led out of this power board 540 is arranged near one side of the power board 540. Thereby, wiring becomes easy, and the wiring lines between the power board 540 and the power connector 90 can be shortened.

In addition, in the electric power steering apparatus according to Embodiment 2 of this invention, a heat sink may be provided on the external wall surface of the speed-reduction-mechanism-side case 60 which protrudes from the housing 24 of the speed reduction mechanism, or the thickness of a wall portion of a metallic case may be largely formed. Thereby, heat dissipation in the power board fixed to the metallic case by abutting can be effectively performed.

In addition, in the electric power steering apparatus according to Embodiment 2 of this invention, the same effects as those of Embodiment 1 can be exhibited in addition to the aforementioned.

Embodiment 3

Figure 7:
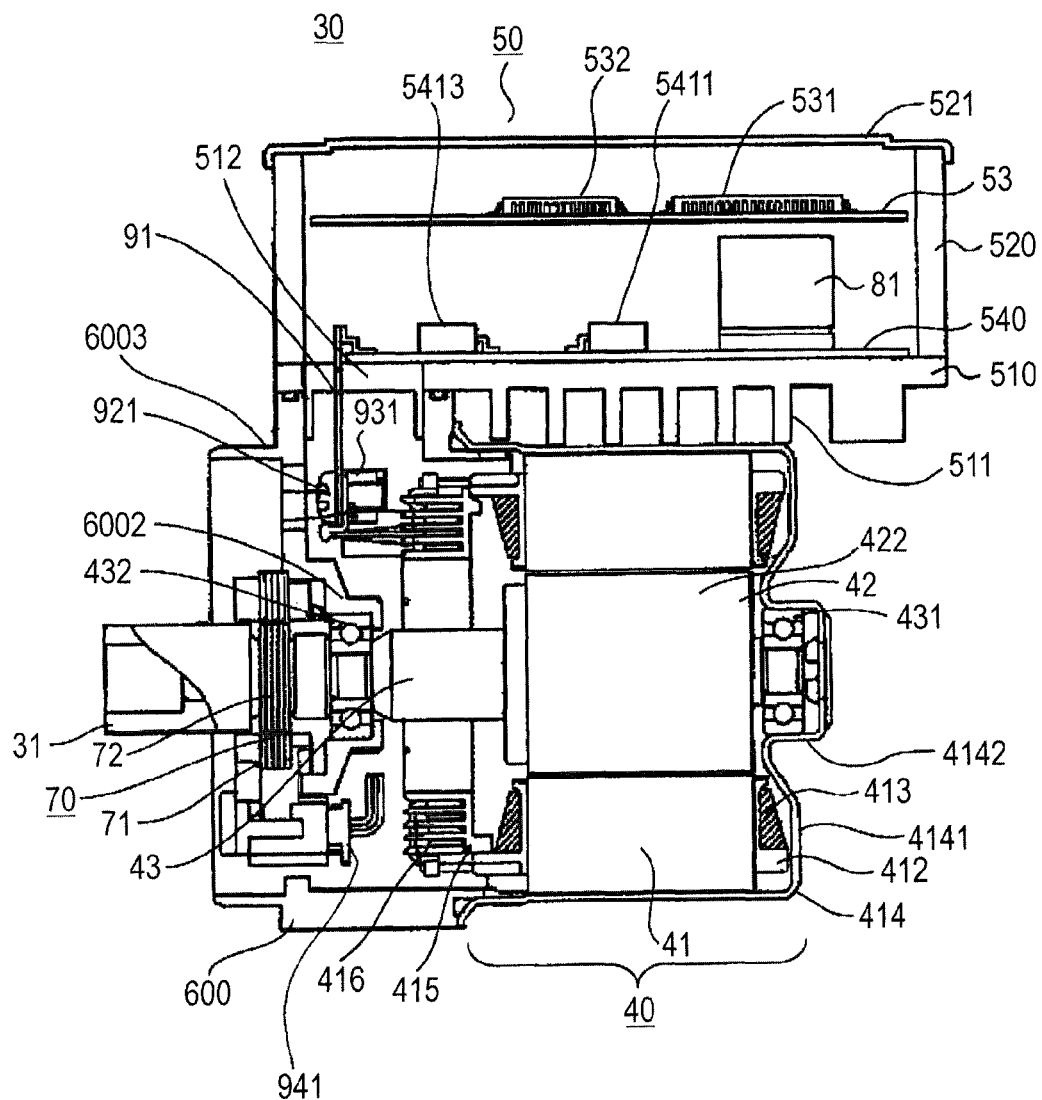
FIG. 7 is a sectional view showing a control device integrated-type electric motor in the electric power steering apparatus according to Embodiment 3 of this invention.
Figure 8:
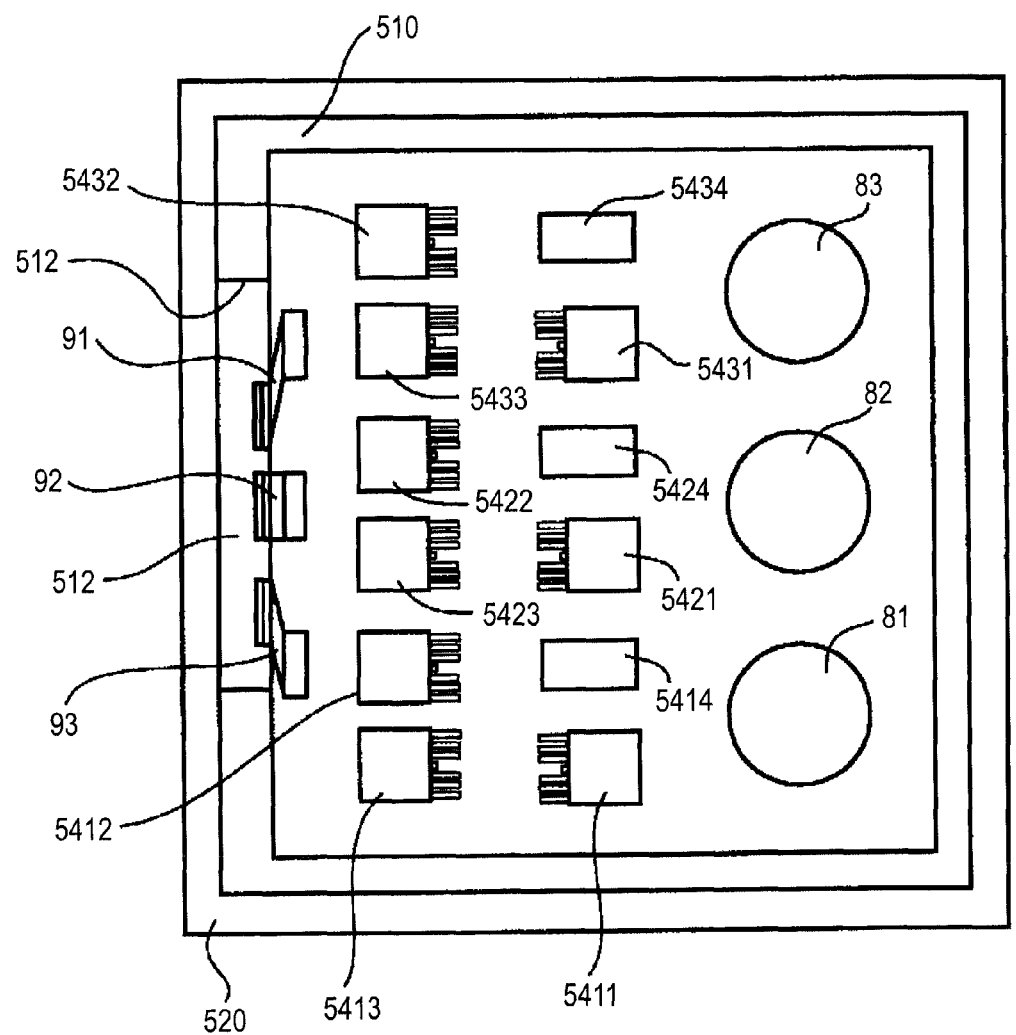
FIG. 8 is a plan view when the inside of a control device case of the control device integrated-type electric motor in the electric power steering apparatus according to Embodiment 3 of this invention is seen from control-board side.

Next, an electric power steering apparatus and a control device integrated-type electric motor according to Embodiment 3 of this invention will be described. FIG. 7 is a sectional view of a control device integrated-type electric motor in an electric power steering apparatus according to Embodiment 3 of this invention, and FIG. 8 is a plan view showing a control device part of the electric motor in a state where a control board is removed. In this Embodiment 3, the control device integrated-type electric motor is constituted as a permanent magnet-type synchronous electric motor.

In FIGS. 7 and 8, the speed-reduction-mechanism-side case 600 fixed to the housing 24 of the speed reduction mechanism is formed from a die-cast molding of aluminum alloy. A spigot portion 6003 formed at the end of the speed-reduction-mechanism-side case 600 is fitted into a housing of a speed reduction mechanism which is not shown, and is fixed to this housing with bolts or the like. The speed-reduction-mechanism-side case 600 is formed with a front bearing box 6002. The front bearing 432 formed from a ball bearing is press-fitted and fixed to an inner peripheral surface of the front bearing box 6002.

The rotation sensor 70 constituted by a resolver includes the stator 71 fixed to the speed-reduction-mechanism-side case 600, and the rotor 72 fixed to the outer peripheral surface of the rotor shaft 43. A power board 540 of the control device part 50 is arranged in the control device case 520, and is brought into close contact with and fixed to the wall portion 601 of the speed-reduction-mechanism-side case 600. The spigot portion formed at an axial open end of the frame is fitted into an electric-motor-side end of speed reduction mechanism side case 600, and the frame 414 of the electric motor part 40 is fixed to the speed-reduction-mechanism-side case 600 with screws (not shown).

The control device case 520 serving as a metallic case includes a heat sink 510 having a fin portion 511, and a cover 521. The control device case 520 is placed on and fixed to an upper portion of the drawing, of the speed-reduction-mechanism-side case 600. The heat sink 510 which becomes the bottom part of the control device case 520 is formed from an aluminum alloy, and is fixed to the lower end of a side wall portion of the control device case 520 with screws.

In addition, a heat sink opening 512 of which the central axis coincide with that of a speed-reduction-mechanism-side case opening formed in a top face portion of the speed-reduction-mechanism-side case 600 is formed in one side of the heat sink 510 in the same shape as the speed-reduction-mechanism-side case opening. The speed-reduction-mechanism-side case opening and the heat sink opening are arranged so that the central axes thereof coincide with and overall each other.

One power board 540 is abutted on and fixed to the surface of the heat sink 510. The power board 540 includes a ceramic base, and as shown in FIG. 8, is mounted with the power element 5411 which constitutes the U-phase positive-electrode-side arm of the three-phase bridge circuit which constitutes the electric motor driving circuit, and the power element 5412 which constitutes the U-phase negative-electrode-side arm; the power element 5421 which constitutes the W-phase positive-electrode-side arm, and the power element 5422 which constitutes the W-phase negative-electrode-side arm; and the power element 5431 which constitutes the V-phase positive-electrode-side arm and the power element 5432 which constitutes the V-phase negative-electrode-side arm.

In addition, the power board 540 is mounted with the semiconductor switch element 5413 inserted between the U-phase winding of the stator winding, and the U-phase output terminal of the three-phase bridge circuit, the semiconductor switch element 5423 inserted between the W-phase winding of the stator winding, and the W-phase output terminal of the three-phase bridge circuit, the semiconductor switch element 5433 inserted between the V-phase winding of the stator winding and the V-phase output terminal of the three-phase bridge circuit, the ground resistor 5414 inserted between the power element 5412 and the grounding potential portion of the vehicle, the ground resistor 5424 inserted between the power element 5422 and the grounding potential portion of the vehicle and the ground resistor 5434 inserted between the power element 5432 and the grounding potential portion of the vehicle.

Moreover, the three capacitors 81, 82, and 83 described in FIG. 4 for absorbing the ripple of an electric current which flows into the stator winding 413 of the electric motor part 40 one coil 84 (not shown) for absorbing noise are mounted on the power board 540. In addition, the two semiconductor switch elements inserted between the positive-electrode-side direct current terminal of the three-phase bridge circuit serving as the electric motor driving circuit, and the external battery, are not shown in the drawing. However, two semiconductor switch elements may be mounted on the power board 540, or the semiconductor switch elements may be mounted on another switch board, and the switch board may be abutted on and fixed to the heat sink 510, or may be abutted on and fixed to the inner surface of a wall portion of the speed-reduction-mechanism-side case 600.

The control board 53 on which the microcomputer 531 and the FET driving circuit 532 are mounted is installed with space from the power board 540 inside the control device case 520. The cover 521 is fixed to the upper end of the control device case 520 with a space on the top face of the control board 53.

Three bus bars 91, 92, and 93, which are connected to the respective U-phase, V phase, and W-phase terminals of the stator winding 413 of the electric motor part 40, are led out to the inside of the control device case 520 via the aforementioned speed-reduction-mechanism-side case opening from the heat sink opening 512, and are respectively connected to the semiconductor switch elements 5413, 5423, and 5433 connected to the alternating-current-side terminal of the aforementioned three-phase bridge circuit.

The aforementioned bus bars 91, 92, and 93 are fixed to a base 931 fixed to the terminal holder 415 with screws 921. In addition, the detection winding provided in the stator of the rotation sensor 70 constituted by a resolver is connected to a control-device-side connector (not shown) provided in the control device case 520 via a connector 941 for signal connection. The control-device-side connector is connected to the microcomputer 531 mounted on the control board 53. The other configurations are the same as those of Embodiment 1.

According to the electric power steering apparatus according to Embodiment 3 of this invention configured as described above, the control device case 520 on which the power board is loaded is provided outside the speed-reduction-mechanism-side case 600. Thus, a design becomes possible which is more specialized in individual functions without mixture of the parts of the electric motor part 40 and parts of the control device part 50.

In addition, since the power board 540 is loaded on the heat sink 510, the heat generated in the semiconductor switch elements is effectively radiated by the heat sink 510 via the power board 540. Accordingly, a size reduction and current increase in the semiconductor switches become possible. In addition, the same effects as the electric power steering apparatus according to the aforementioned Embodiment 1 can be exhibited.

Embodiment 4

Figure 9:
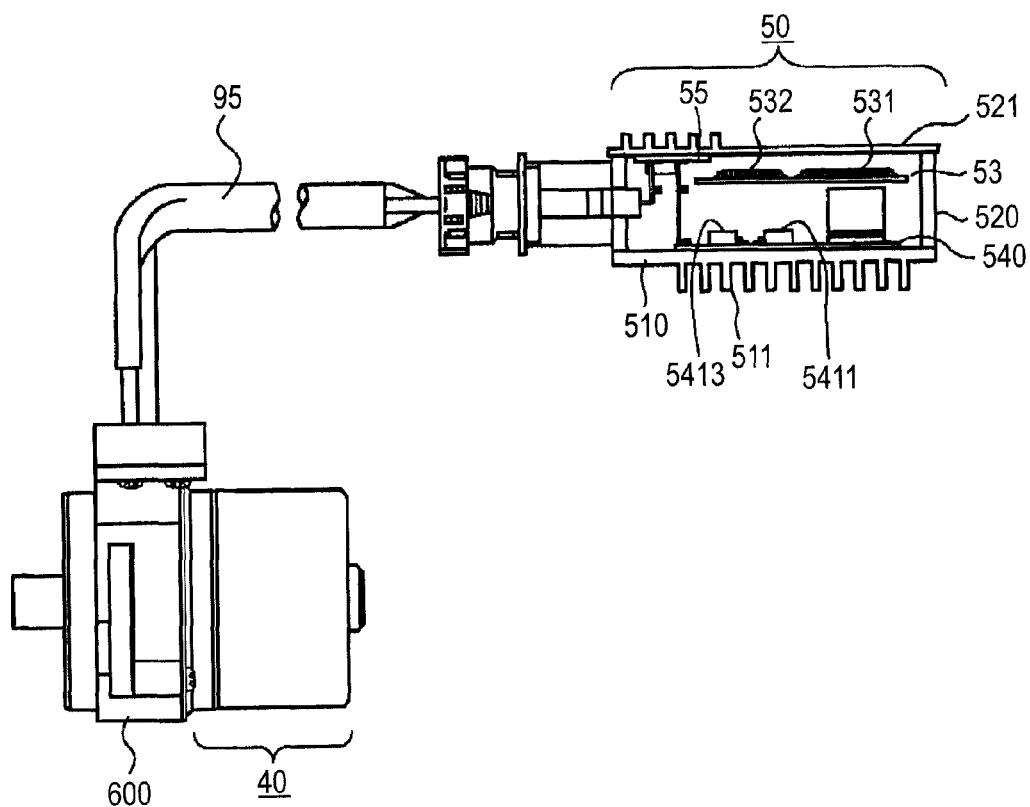
FIG. 9 is a configuration view showing an electric power steering control according to Embodiment 4 of this invention.

Next, the electric power steering apparatus according to Embodiment 4 of this invention will be described. FIG. 9 is a configuration view showing an electric power steering control according to Embodiment 4 of this invention, and shows a control device part in a cross-section. In this Embodiment 4, the control device integrated-type electric motor is constituted as a permanent magnet-type synchronous electric motor.

In the electric power steering apparatus of this Embodiment 4, as shown in FIG. 9, the electric motor 40 and the control device part 50 are separately configured, and the respective U-phase, V-phase, and W-phase terminals of the stator winding of the electric motor part 40, and the detection winding of the rotation sensor constituted by a resolver are connected to the control device part 50 by a harness 95. In addition, the power board 540 on which the power elements are mounted, and the switch board 55 on which the semiconductor switch elements are mounted are separately formed, the power board 540 is abutted on and fixed to the heat sink 510, and the switch board 55 is abutted on and fixed to the cover 521.

The harness 95 is connected to the three-phase bridge circuit serving as the electric motor driving circuit inside the control device case 520 via an opening provided in the side wall portion of the control device case 520. Other configurations are the same as those of the electric power steering apparatus according to Embodiment 3.

According to the electric power steering apparatus according to Embodiment 4 of this invention configured as described above, in addition to the aforementioned advantages of the electric power steering apparatus according to the aforementioned Embodiment 3, there is an advantage that there is no inflow of heat into the control device part 50 from the electric motor part 40 even if the temperature of the electric motor part 40 is higher than the temperature of the control device part 50 since the electric motor part 40 is provided separately from the control device part 50.

Embodiment 5

Figure 10:
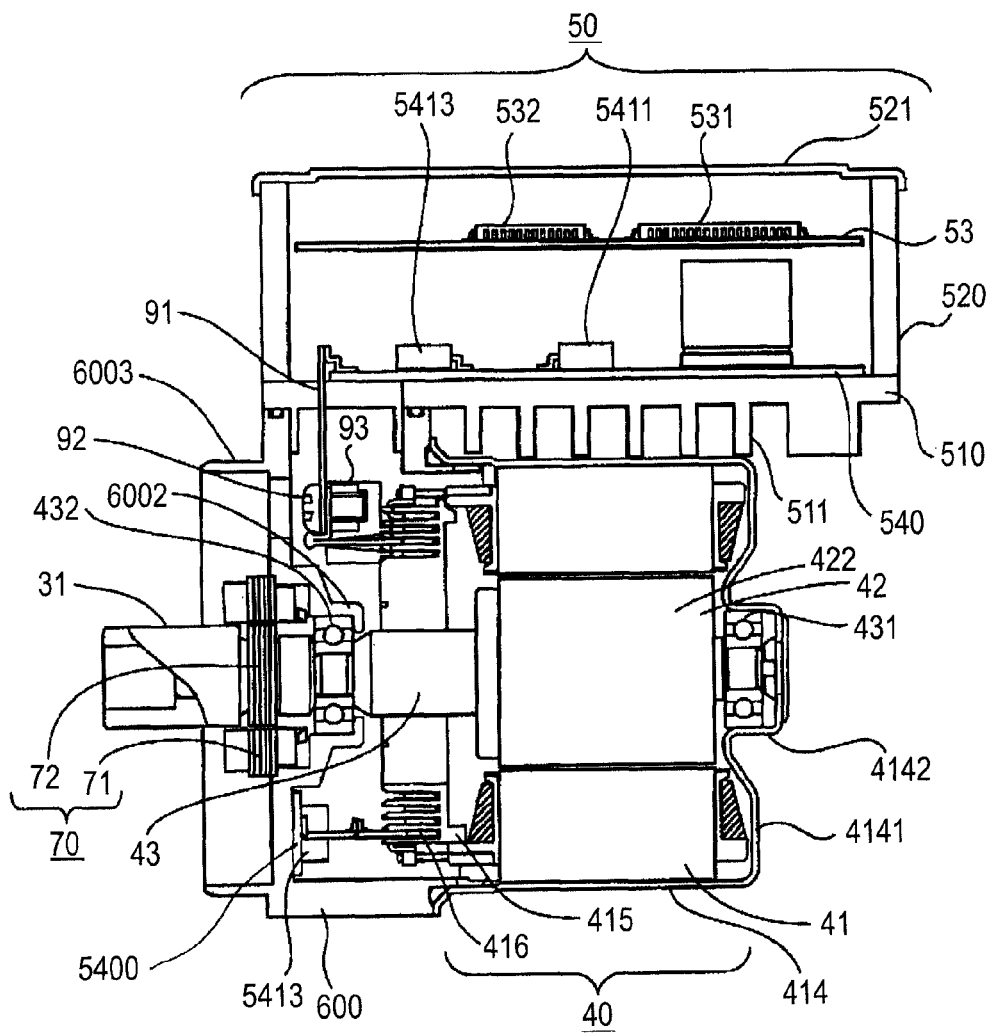
FIG. 10 is a sectional view of a control device integrated-type electric motor in the electric power steering apparatus according to Embodiment 5 of this invention.

Next, an electric power steering apparatus and a control device integrated-type electric motor according to Embodiment 5 of this invention will be described. FIG. 10 is a sectional view of a control device integrated-type electric motor in the electric power steering apparatus according to Embodiment 5 of this invention.

The control device integrated-type electric motor in the electric power steering apparatus according to Embodiment 5 of this invention is different in the configuration of the following portions as compared to the case of the aforementioned Embodiment 3. That is, although the semiconductor switch elements 5413, 5423, and 5433 for interrupting the conduction within the electric motor part 40 are mounted on the power board 540 in Embodiment 3, respectively. In this embodiment 5, as shown in FIG. 10, the semiconductor switch element 5413 for interrupting the conduction within the electric motor part 40 is mounted on the switch board 5400 abutted on and fixed to the inside of the wall portion of the speed-reduction-mechanism-side case 600.

The one semiconductor switch element 5413 mounted on the switch board 5400 is connected to a neutral point of the armature winding 413, in the winding terminal 416 housed in the terminal holder 415 of the electric motor part 40 via terminals. That is, the one semiconductor switch elements 5413 can interrupt the conduction between phase windings for at least two phases among the respective Y-connected phase windings of the armature winding. The other configurations are the same as those of the aforementioned Embodiment 3.

According to the electric power steering apparatus according to Embodiment 5 of this invention configured as described above, the switch board 5400 on which the semiconductor switches for interrupting the conduction within the electric-motor part are mounted, and the power board 540 on which the power elements are mounted are separated, the switch board 5400 is fixed to the speed-reduction-mechanism-side case, and the power board 540 is fixed to the heat sink 510 of the control device part 50. Individual sizes of the electric motor part 40 and the control device part 50 can be made smaller. In addition, the same advantages as the advantages of the electric power steering apparatus according to Embodiment 3 of this invention as mentioned above are provided.

Modification of Embodiment

In addition, according to the aforementioned Embodiments 1 and 2, the speed-reduction-mechanism-side case 60 and the speed reduction mechanism 20 are separately provided. However, the speed-reduction-mechanism-side case 60 and the housing 24 of the speed reduction mechanism 20 may be integrally configured. By adopting this configuration, the thermal conductivity between the power board and the switch board, and the speed reduction mechanism is further improved. Heat dissipation performance of the semiconductor switch elements which interrupt the conduction between the electric motor driving circuit of the control device part and the battery outside the electric motor, the switch elements which interrupts the conduction between the electric motor driving circuit and the stator winding within the electric motor part, and the power elements can be made better. In addition, since the speed-reduction-mechanism-side case 60 and the housing 24 of the speed reduction mechanism are integrally configured, there are advantages that a reduction in the number of person-hours caused by a reduction in the number of parts, a cost reduction, a weight reduction, or the like can be achieved.

In addition, although it has been described that the material of the power board in the aforementioned Embodiments 1 to 5 is a ceramic base, the invention is not limited thereto. For example, power elements and semiconductor switch elements may be mounted on a metallic board with bear chips, or discrete parts may be mounted.

Moreover, although it has been described that the type of the electric motor in the aforementioned Embodiments 1 to 5 is a permanent magnet-type synchronous electric motor, the invention is not limited thereto. For example, other types of electric motors, such as an induction motor, may be adopted as long as the motors can be used for the electric power steering apparatus. In this case, for example, if an electric motor which does not use permanent magnets is adopted, the interference in magnetic flux between a switching circuit for a power element, such as an FET driving circuit, and permanent magnets is also eliminated, which is favorable.

In addition, although it has been described that the rotation sensor in the aforementioned Embodiments 1 to 5 is constituted by a resolver, the invention is not limited thereto. For example, other types of rotation sensors, such as a Hall-type rotation sensor, may be adopted as long as the rotation sensors can be applied to the electric power steering apparatus. For example, if a Hall-type rotation sensor is used as the rotation sensor, the space which is required for the attachment of the sensor can be reduced as compared with a resolver-type rotation sensor. Thus, there is an advantage that constraints in terms the size and shape of the power board or the like on which the aforementioned semiconductor switch elements and power elements are loaded are alleviated.

INDUSTRIAL APPLICABILITY

The electric power steering apparatus and control device integrated-type electric motor according to this invention are used in the field of a steering device in an automobile industry.

The invention claimed is:

1. An electric power steering apparatus adapted to detect steering torque applied to a steering shaft by a driver of a vehicle via a steering wheel, and apply an assist torque corresponding to the detected steering torque to the steering shaft by an electric motor via a speed reduction mechanism, the electric power steering apparatus comprising:
an electric motor driving circuit constituted by a plurality of semiconductor power elements and controlling electric power supplied to an armature winding of the electric motor;

a first switch element for opening and closing a connection between an input terminal of the electric motor driving circuit and an external power source, and a second switch element for opening and closing the armature winding, wherein:

at least one of the first switch element and the second switch element is constituted by a semiconductor switch element;

the armature winding is constituted by multi-phase AC windings;

the electric motor driving circuit is constituted by a multi-phase bridge circuit constituted by the plurality of power elements;

the plurality of power elements and the semiconductor switch element are mounted on a board attached to a metallic case;

a plurality of boards form a discrete arrangement around a rotor shaft of the electric motor;

each board of the plurality of boards contains at least two power elements of the plurality of power elements located thereon; and each board is attached to the metallic case, wherein:

the plurality of power elements are mounted on different respective boards which each constitute an arm of a same phase as the multi-phase bridge circuit; and the respective boards on which the plurality of power elements are mounted are arranged radially around an axial center of the rotor shaft of the electric motor.

2. The electric power steering apparatus according to claim 1, wherein:

the power elements and the first switch element are mounted on different boards, respectively; and the board on which the first switch element is mounted is arranged between two boards on which the power elements are mounted.

3. An electric power steering apparatus adapted to detect steering torque applied to a steering shaft by a driver of a vehicle via a steering wheel, and apply an assist torque corresponding to the detected steering torque to the steering shaft by an electric motor via a speed reduction mechanism, the electric power steering apparatus comprising:

an electric motor driving circuit constituted by a plurality of semiconductor power elements and controlling electric power supplied to an armature winding of the electric motor; and a semiconductor switch element for opening and closing the armature winding, wherein:

the armature winding is constituted by multi-phase AC windings;

the electric motor driving circuit is constituted by a multi-phase bridge circuit constituted by the plurality of power elements;

the plurality of power elements and the semiconductor switch element are mounted on a board attached to a metallic case;

a plurality of boards form a discrete arrangement around a rotor shaft of the electric motor, the plurality of power elements and the semiconductor switch element are located on the plurality of boards; and each board of the plurality of boards contains at least two elements selected from the group consisting of the plurality of power elements and the semiconductor switch element, located thereon, wherein:

the at least two elements mounted on a same board constitutes an arm of a same phase of the multi-phase bridge circuit; and respective boards on which the plurality of power elements and the semiconductor switch element are mounted are arranged radially around an axial center of the rotor shaft of the electric motor.

4. A control device integrated-type electric motor used for a power steering apparatus adapted to detect steering torque applied to a steering shaft by a driver of a vehicle via a steering wheel and apply an assist torque corresponding to the detected steering torque to the steering shaft, and applying the assist torque to the steering shaft via a speed reduction mechanism, the electric motor comprising:

an electric motor part including a stator, a rotor, and an armature winding; and a control device part integrally fixed to the electric motor part, wherein:

the control device part includes a control device part internal space communicating with an internal space of the electric motor part, and houses, in the control device part internal space, an electric motor driving circuit constituted by a plurality of semiconductor power elements and controlling electric power supplied to the armature winding of the electric motor, a first switch element for opening and closing a connection between an input terminal of the electric motor driving circuit and an external power source, and a second switch element for opening and closing the armature winding;

at least one of the first switch element and the second switch element is constituted by a semiconductor switch element;

the armature winding is constituted by multi-phase AC windings;

the electric motor driving circuit is constituted by a multi-phase bridge circuit constituted by the plurality of power elements;

the plurality of power elements and the semiconductor switch element are mounted on a board attached to a metallic case of the control device part;

a plurality of boards form a discrete arrangement around a rotor shaft of the electric motor;

each board of the plurality of boards contains at least two power elements of the plurality of power elements located thereon; and each board is attached to the metallic case, wherein:

the plurality of power elements are mounted on a same board at least per unit, which constitutes an arm of a same phase of the multi-phase bridge circuit; and respective boards on which respective power elements are mounted are arranged radially around an axial center of the rotor shaft of the electric motor.

5. The control device integrated-type electric motor according to claim 4, wherein:

the power elements and the first switch element are mounted on different boards, respectively; and the board on which the first switch element is mounted is arranged between two boards on which the power elements are mounted.

6. A control device integrated-type electric motor used for a power steering apparatus adapted to detect steering torque applied to a steering shaft by a driver of a vehicle via a steering wheel and apply an assist torque corresponding to the detected steering torque to the steering shaft, and applying the assist torque to the steering shaft via a speed reduction mechanism, the electric motor comprising:

an electric motor part including a stator, a rotor, and an armature winding; and a control device part integrally fixed to the electric motor part, wherein:

the control device part includes a control device part internal space communicating with an internal space of the electric motor part, and houses, in the control device part internal space, an electric motor driving circuit constituted by a plurality of semiconductor power elements and controlling electric power supplied to the armature winding of the electric motor and a semiconductor switch element for opening and closing the armature winding;

the armature winding is constituted by multi-phase AC windings;

the electric motor driving circuit is constituted by a multi-phase bridge circuit constituted by the plurality of power elements;

the plurality of power elements and the semiconductor switch element are mounted on a board attached to a metallic case;

a plurality of boards form a discrete arrangement around a rotor shaft of the electric motor;

each board of the plurality of boards contains at least two elements consisting from the plurality of power elements and the semiconductor switch element located thereon; and each board is attached to the metallic case, wherein:

the at least two of the plurality of power elements are mounted on a same board which constitutes an arm of a same phase of the multi-phase bridge circuit; and respective boards on which respective power elements are mounted are arranged radially around an axial center of the rotor shaft of the electric motor.

* * * * *